3,265,716
Patented August 9, 1966

3,265,716
EPOXIDATION OF OLEFINS DURING THE SIMULTANEOUS AIR OXIDATION OF SECONDARY ALDEHYDES
Joseph B. Dickey, Edmund B. Towne, and James P. Hawk, Kingsport, Tenn., assignors to Eastman Kodak Company, Rochester, N.Y., a corporation of New Jersey
No Drawing. Filed July 9, 1963, Ser. No. 293,859
8 Claims. (Cl. 260—348.5)

This invention relates to the preparation of epoxides from certain olefins during the simultaneous air oxidation of secondary aliphatic aldehydes to the corresponding acids. More particularly the invention relates to the preparation of epoxides during the simultaneous air oxidation of isobutyraldehyde to isobutyric acid.

The preparation of epoxides by reacting olefins with preformed peracids is well known in the Preleshajew reaction [Ber. 42, 4811 (1909); also referred to by Swern, Organic Reactions, 7, 378 (1953)]. The preparation of cyclododecadiene epoxide using preformed peracetic acid, performic acid, or the so-called acetaldehyde monoperacetate (peracetic acid-acetaldehyde complex) as the epoxidizing agent has been described in British Patent 849,238. The epoxidation of a number of other olefins by air in the presence of primary aldehydes has been described in the literature, but in every instance, the use of a catalyst was necessary and a considerable build-up of peracids took place in every instance. For example, it has been proposed to oxidize benzaldehyde, acetaldehyde, or propionaldehyde with air at 0° C.–5° C. in the presence of U.V. light and at the same time to epoxidize oleic acid and its esters (42 percent) as disclosed by Swern and Findley, J.A.C.S., 22, 4315 (1950), and in Advances in Organic Chemistry, vol. I, p. 127, ref. 138; Interscience Publishers. Likewise, it has been suggested to oxidize benzaldehyde in acetone with dry air at 25° C. in the presence of U.V. light and to epoxidize oleic acid, perbenzoic in this case being the epoxidizing agent [J.A.C.S., 66, 1925 (1944)]. Similarly, the epoxidation of oleic acid, octenes, and squalene with oxygen and benzaldehyde under the influence of U.V. light is disclosed in J. Chim. Phys., 28, 480 (1931), C.A., 26, 900 (1932), Compt. Rend., 191, 616 (1930), C.A., 25, 505 (1931).

In the commercial production of epoxides the systems employed fall in two general classifications. One system employs a preformed peracid as the epoxidizing agent, while in the other the peracid is produced in situ. In the system in which the preformed peracid is employed it is necessary to prepare, store and transport large quantities of hazardous compounds such as peroxyacetic acid. In certain of these processes, of either type, the resultant peroxy acid is liable to be contaminated with traces of mineral acids such as sulfuric acid which tends to catalyze the hydrolysis of the epoxide product with resulting undesired diol formation. Another disadvantage of processes in which a peroxy acid such as peroxyacetic acid is formed in the reaction mixture is the necessity for the employment of quantities of hydrogen peroxide. A further disadvantage is the presence of a strong mineral acid such as sulfuric acid in the reaction mixture. A still further disadvantage is that in some processes it is necessary to fractionate mixtures containing the peroxy acid compounds before use. In view of these numerous disadvantages it will be readily understood by those skilled in the art to which this invention relates that it would be highly desirable, especially from the safety standpoint, to be able to carry out epoxidation reactions under such conditions that the concentration of peroxy acid is kept at an extremely low value. It would also be highly desirable to provide a process in which the system is not contaminated with a strong mineral acid such as sulfuric acid thus reducing the loss of epoxide product by acidolysis and hydrolysis. These advantages constitute one of the chief desiderata of the present invention as will be more fully set forth as the description proceeds.

This invention has as an object to provide an economical, highly efficient process for the simultaneous production of aliphatic acids and epoxy compounds.

Another object is to provide a process for the simultaneous production of secondary aliphatic acids and epoxy compounds without the employment of substantial amounts of hazardous and explosive peroxy compounds.

A further object is to provide a process of producing valuable epoxides under such conditions that losses of the desired epoxide by hydrolysis or other reactions inducing cleavage of the oxirane ring of the epoxy compound are minimized.

A still further object is to provide a process of simultaneously producing a secondary aliphatic acid and an epoxy compound from which the epoxy component may be readily separated in substantially pure form without decomposition.

Other objects will appear hereinafter.

These objects are accomplished by the following invention which in its broader aspects, comprises the low temperature, liquid phase, non-catalytic epoxidation of an olefin to produce an epoxide during the simultaneous oxidation of a secondary aliphatic aldehyde to the corresponding aliphatic acid by means of oxygen or an oxygen-containing gas. In carrying out our invention the selected olefin, preferably in liquid form at reaction temperature, is placed in a suitable reaction vessel along with the secondary aliphatic aldehyde to be converted to the corresponding aliphatic acid. Oxygen or other oxygen-containing gas such as air is then bubbled into the liquid mixture. Since two reactions are here involved, namely, epoxidation of the olefin and oxidation of the aldehyde, both of which are exothermic, proper provision is made for controlling the temperature of the reacting mixture within the range of from about 0° C. to about 60° C., and preferably within the range of 20° C. to 50° C. The oxygen or oxygen-containing gas is passed into the reaction mixture until the desired degree of epoxidation of the olefin is attained.

The reaction time required will depend upon the chemical composition of the olefin undergoing epoxidation, the nature of the secondary aliphatic aldehyde being converted to the corresponding acid, the ratio of olefin to aldehyde and various other factors or variables which may enter into the reaction. In general a period of from about 2 to 14 hours will be sufficient to obtain the epoxide and acid products in the desired yields. The degree of epoxidation of the olefin obtained in accordance with our process is generally of the order of 60 to 90 percent.

The ratio of olefin to secondary aldehyde may vary from 1 to 2 to 1 to 20, a preferred range being from 1 to 4 to 1 to 8. The ratio employed will depend upon yield-ratio of the respective epoxide and acid products desired. For example, if a high yield of epoxide per mole of aldehyde oxidized is desired a lower ratio of olefin to aldehyde will be employed, such as 1 to 2 or 1 to 4. On the other hand if a high yield of acid is desired rather than a high yield of epoxide the ratio of olefin to aldehyde will be in the vicinity of 1 to 10 to 1 to 20.

Our process may be carried out at either atmospheric or superatmospheric pressure, as for example, within the range of about 15 to about 50 p.s.i. absolute.

The particular olefin selected for epoxidation will depend upon the epoxide product desired to be produced simultaneously with the secondary aliphatic acid. Examples of olefins which may be epoxidized in accordance with our invention are cyclododecatriene, dicyclopentadiene, 2-methyl-2-heptene, butene-2, octene-1, cyclooctene, cyclooctadiene, cyclohexene, etc. In addition to these specific olefins and polyunsaturated compounds which may be epoxidized by our process are members of the general class consisting of olefinic compounds containing either straight or branched chains, internal or terminal ethylenic unsaturation and without electron-withdrawing groups, such as halogen, carboxy, or carbonyl, adjacent to the double bond. Other olefins such as cyclic and polycyclic olefins, without the above described negative substitution, may also be readily epoxidized by our process. Certain olefins, however, are not susceptible of epoxidation in accordance with our process, examples of such olefins being compounds with electron-withdrawing groups adjacent to the double bond, such as styrene, methyl 2-ethyl-2-hexenoate, etc.

Among the secondary aliphatic aldehydes which may be converted to the corresponding secondary aliphatic acids simultaneously with the production of the epoxides in accordance with our invention, are isobutyraldehyde and other secondary aliphatic aldehydes having 4 or more carbon atoms. For example, some of the more readily available aldehydes suitable for our invention include 2-methyl butyraldehyde, 2-ethylhexaldehyde, 2-ethyl-4-methyl valeraldehyde and 2,2-dimethyl pentanal.

While the use of diluents are not necessary to the carrying out of our process they may advantageously be employed if desired. Examples of such diluents are heptane, isobutyric acid and ethyl acetate.

Although we do not confine ourselves to any theory or explanation of the mechanism of the reactions involved in our improved process, it is believed that the reactions involved are as follows:

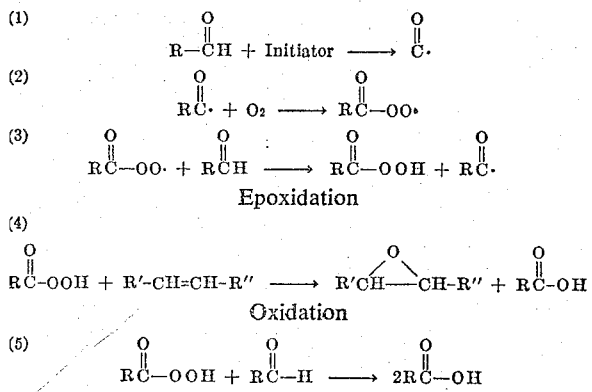

wherein R, R' and R'' may each be, for example, an alkyl group.

The chain mechanism for the sequence of reactions which occur in our invention, leading to the production of epoxides from olefins by the action of peroxy acids, is believed to involve the reaction of a molecule of the participating aldehyde with an initiator, such as a free radical, to produce an acyl radical. This acyl radical may then react with a molecule of oxygen to produce a peracyloxy free radical. This peracyloxy free radical then reacts with another molecule of aldehyde to produce a molecule of peroxy acid and an acyl free radical. The peroxy acid may then react with either a molecule of olefin to produce an epoxide and the acid corresponding to the participating aldehyde, or it may react with a molecule of aldehyde to produce two molecules of acid as in Equation 5. It is of course to be understood that in our process both reactions are taking place simultaneously to produce the epoxide and the acid. The acyl radical formed in Equation 3 above, may react with a molecule of oxygen or another molecule of aldehyde to propagate the chain mechanism.

In the following examples and description we have set forth several of the preferred embodiments of our invention but they are included merely for purposes of illustration and not as a limitation thereof.

Example I

The oxidation unit used in this invention consisted of a glass oxidation column 2 in. in diameter and 36 in. high equipped with a fritted glass disc for air dispersion, an air source entering through the frit, a thermometer, and a water condenser connected to two Dry Ice traps. The column had an internal cooling coil and was externally wrapped with a Nichrome heating tape connected to a temperature controller. In the oxidation column there was placed 38.4 g. (0.237 mole) of freshly distilled cyclododecatriene, 150 g. (2.1 moles) of isobutyraldehyde and 150 g. of heptane as solvent. Air was bubbled into the reaction mixture at the rate of 2.5 cu. ft. per hr. for 4 hrs. at 45–50° C. Titration of a sample of the reaction mixture showed 114 g. (1.3 moles) of isobutyric acid to be present. This is a conversion of 63 percent by titration. The reaction mixture was then distilled through a packed column yielding as a first cut isobutyraldehyde, heptane and water of which 36 g. (0.50 mole) was isobutyraldehyde as determined by gas chromatography. A second cut consisted of 108 g. (1.23 moles) of practically pure isobutyric acid (59 percent conversion). Taking account of recovered aldehyde, the yield of isobutyric acid was 77 percent. A weighed sample of the residue was analyzed for epoxy oxygen, showing 33.4 g. (0.188 mole) of cyclododecadiene epoxide, which boiled at 130–31° at 10 mm. and had a refractive index, $n_D^{20}$ 1.5050. This is a conversion of 79.4 percent based on cyclododecatriene. Taking account of a small amount of recovered cyclododecatriene, the yield of epoxide was about 90 percent. The weight ratio of isobutyric acid to epoxide was 114 g.:33.4 g.=3.4:1. The mole ratio of aldehyde to olefin used was 9:1.

Example II

In the oxidation column described in Example I, was placed 81 g. (0.50 mole) of freshly distilled cyclododecatriene and 216 g. (3.0 moles) of isobutyraldehyde. No diluent was used in this experiment. Air was introduced at the rate of 2.0 cu. ft. per hr. for 8 hrs. at 50° C. Titration of the reaction mixture indicated 147 g. (1.67 moles) of isobutyric acid which is a 56 percent conversion. The reaction mixture was diluted with 300 cc. of heptane and then washed in a separatory funnel first with 1½ liters of water and then with 500 cc. 10 percent $Na_2CO_3$ solution to remove the isobutyric acid and any unreacted isobutyraldehyde. The nonaqueous layer was dried over $MgSO_4$ and then was distilled through a packed column in order to remove heptane and other low boilers up to a pot temperature of 95° C. at about 280 mm. The residue was analyzed for epoxy oxygen and was found to contain 62.7 g. (0.352 mole) of cyclododecadiene epoxide. This is a conversion of 70.4 percent.

Example III

Aldehyde:olefin 13.6:1. Operating as in Example I, a mixture of 25 g. (0.154 mole) of freshly distilled cyclododecatriene, 150 g. (2.1 moles) of isobutyraldehyde and 68 g. of heptane was oxidized with air for 3 hrs. There was obtained 122 g. (1.39 moles) of isobutyric acid by titration and 18.6 g. (0.104 mole) of cyclododecadiene epoxide. These are respective conversions of 66 percent to acid and 67.5 percent to epoxide. The weight ratio of acid to epoxide was 6.6:1.

Example IV

Operating as in Example I, a mixture of 35 g. (0.313 mole) of 2-methyl-2-heptene, 150 g. (2.1 moles) isobutyraldehyde, and 150 g. of ethylacetate as solvent was oxidized with air for 14 hrs. at 20–35° C. There was obtained 18 g. (0.14 mole) of 2-methyl-2-epoxyheptane (boiling point about 140°) and 103 g. (1.17 moles) of isobutyric acid.

Example V

Operating as in Example I, a mixture of 25 g. (0.189 mole) of dicyclopentadiene, 150 g. (2.1 moles) of isobutyraldehyde and 150 g. of heptane solvent was oxidized with air for 4 hrs. at 30° C. There was obtained 12.2 g. (0.082 mole) of a monoepoxy derivative of dicyclopentadiene (probably mainly 5,6-epoxy-3a,4,5,6,7,7a-hexahydro-4,7-methanoindene).

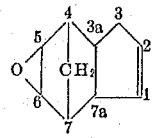

boiling at 100–103/10 mm. Also obtained was 111 g. (1.35 moles) of isobutyric acid, a 65 percent conversion.

Example VI

Operating as in Example I, a mixture of 16.2 g. (0.15 mole) of cyclooctene, 108 g. (1.5 moles) of isobutyraldehyde, and 108 g. of heptane solvent was charged to the oxidizer and oxidized with air for 5.5 hrs. at 46° C. Epoxy-cyclooctane was obtained in a 46 percent conversion and near 90 percent yield.

Our invention provides many advantages over related prior art processes, among which may be mentioned the fact that any one of a considerable number of valuable epoxides may be produced which may be converted by well-known processes to epoxy resins having numerous industrial and other applications, while at the same time producing substantial amounts of the aliphatic acid corresponding to the aldehyde employed. One of the especially advantageous features of the invention is that the process does not involve the use of substantial concentrations of dangerous explosive or unstable peracids in the reaction mixture as is the case in certain well known industrial epoxidation processes. Another advantage is that no mineral acid or acidic ion-exchange resin is required, as in the in situ preparation of peracetic or other peracid, with the desirable result that hydrolysis of the epoxide product is kept at a minimum. A still further advantage of the invention derives from the fact that by employing our process one can, not only produce a valuable aliphatic acid from an aldehyde but is enabled to take advantage of the prevailing reaction conditions, which produce a peroxy acid intermediate, to simultaneously epoxidize an olefin to produce an even more valuable epoxide. Furthermore, as indicated above, from the safety standpoint our process completely eliminates any build-up of peroxyacids or other peroxy intermediates, as is the case with the conversion of low molecular weight primary aldehydes, such as acetaldehyde, under low temperature conditions since the peracid intermediate formed under the conditions of our process is extremely reactive to produce the acid and simultaneously to produce the epoxide from the olefin present.

Inasmuch as the present invention involves the production of epoxides useful in the production of epoxy resins which in themselves are useful and have a wide variety of industrial and other practical applications, as well as producing acid products of obvious industrial usefulness, no extended discussion of uses of the invention is requisite.

Although the invention has been described in considerable detail with particular reference to certain preferred embodiments thereof, variations and modifications can be effected within the spirit and scope of the invention as described hereinabove, and as defined in the appended claims.

We claim:

1. A low temperature, liquid phase, non-catalytic process of simultaneously producing an epoxide and a secondary aliphatic acid which comprises passing oxygen or an oxygen-containing gas through a liquid mixture of an olefin hydrocarbon selected from the group consisting of the cyclic, polycyclic and the straight and branched chain olefin hydrocarbons, and a secondary aliphatic aldehyde having the formula $C_nH_{2n}O$, wherein $n$ is a whole number from 4 to 8, in which mixture the olefin to aldehyde ratio is from 1 to 2 to 1 to 20, at a temperature within the range of about 0° C. to about 60° C. at a pressure within the range of 15–50 p.s.i. absolute for a period of about 2 hours to about 14 hours and wherein said process is carried out without the addition of an acid thereto.

2. The process of claim 1 in which the olefin is selected from the group consisting of cyclododecatriene, dicyclopentadiene, 2-methyl-2-heptene, butene-2, octene-1, cyclooctene, cyclooctadiene and cyclohexene.

3. The process of claim 1 in which the olefin is selected from the group consisting of cyclododecatriene, dicyclopentadiene, 2-methyl-2-heptene, butene-2, octene-1, cyclooctene, cyclooctadiene and cyclohexene and in which the secondary aliphatic aldehyde is selected from the group consisting of isobutyraldehyde, 2-methyl butyraldehyde, 2-ethylhexaldehyde, 2-ethyl-4-methyl valeraldehyde and 2,2-dimethyl pentanal..

4. The process of claim 1 in which the olefin is cyclododecatriene and the aldehyde is isobutyraldehyde.

5. The process of claim 1 in which the olefin is cyclooctene and the aldehyde is isobutyraldehyde.

6. The process of claim 1 in which the olefin is 2-methyl-2-heptene and the aldehyde is isobutyraldehyde.

7. The process of claim 1 in which the olefin is dicyclopentadiene and the aldehyde is isobutyraldehyde.

8. The process of claim 1 in which the olefin is cyclooctadiene and the aldehyde is isobutyraldehyde.

References Cited by the Examiner
UNITED STATES PATENTS

| | | | |
|---|---|---|---|
| 2,316,604 | 4/1943 | Loder | 260—348.5 |
| 2,567,930 | 9/1951 | Findley et al. | 260—348.5 |
| 2,748,148 | 5/1956 | Fancher et al. | 260—348.5 |
| 2,873,283 | 2/1959 | Yang | 260—348.5 |

WALTER A. MODANCE, *Primary Examiner.*

NICHOLAS RIZZO, *Examiner.*

NORMA MILESTONE, *Assistant Examiner.*